June 24, 1930.      L. H. CROOK      1,767,966
WING SYSTEM WITH STABILIZING VANES FOR AIRCRAFT
Filed March 20, 1928      2 Sheets-Sheet 1

Inventor
Louis H. Crook

By Herman Jacobsson
Attorney

June 24, 1930.  L. H. CROOK  1,767,966
WING SYSTEM WITH STABILIZING VANES FOR AIRCRAFT
Filed March 20, 1928  2 Sheets-Sheet 2
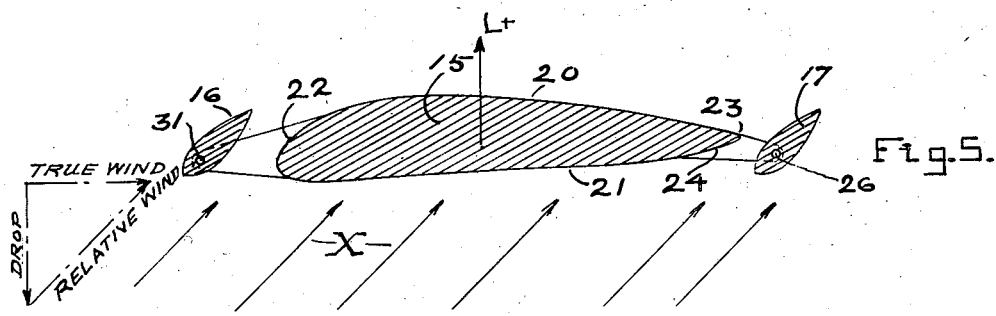
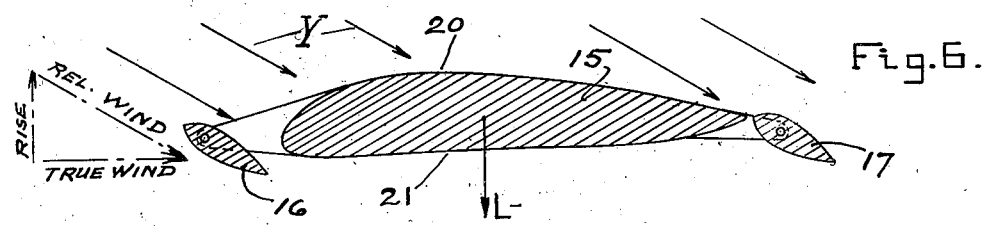
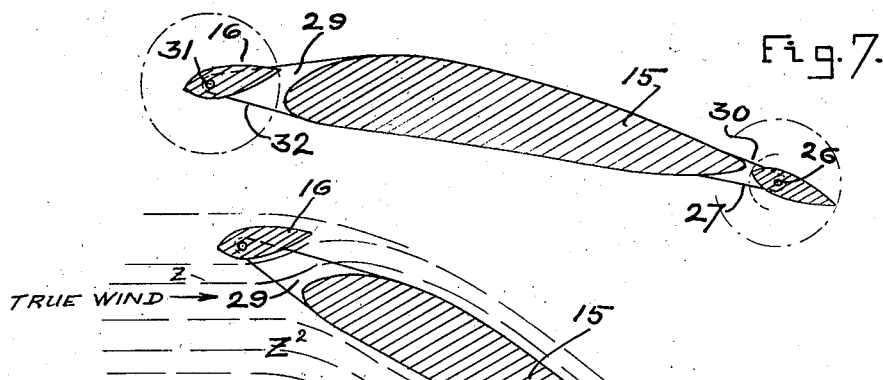
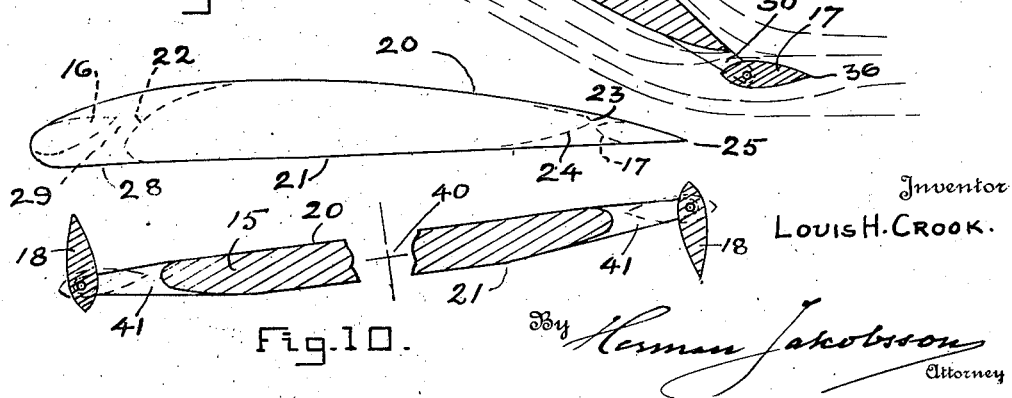
Inventor
Louis H. Crook.
By Herman Jakobsson
Attorney Patented June 24, 1930

1,767,966

UNITED STATES PATENT OFFICE

LOUIS H. CROOK, OF WASHINGTON, DISTRICT OF COLUMBIA

WING SYSTEM WITH STABILIZING VANES FOR AIRCRAFT

Application filed March 20, 1928. Serial No. 263,155.

My invention pertains to a new type of wing which is capable of automatically changing its aerodynamic characteristics so as to correct many well known air flow disturbances that occur during flight of an airplane.

It is conceded that excellent wing shapes are now in use for high speed and normal, straight ahead flying, but that such wing construction does not act favorably during a climb and loses its lifting power above an angle of about 15°.

Now the aim of my present invention is to provide a wing that will not lose its efficiency during a speedy climb and will not burble when ascending at abnormal angles.

This object is attained by constructing the wing in several sections, which during normal flight retains the contour of an ordinary wing, but when at an angle to the horizontal plane changes its contour and permits the air to follow a different path, thus preventing the dangerous burble and assists in stabilizing the airplane and facilitates climb and landing.

All flyers and wind tunnel experimenters are familiar with the dangers that accompany a "stall," "burble," "spin," auto-rotation, etc.

This invention is the result of many years of wind tunnel experiments in my own wind tunnels, and the apparatus described below performs even better than the description is able to tell.

A study of the commonly used wings shows that they can be placed in a "stall" at very low angles of attack. In these stall conditions the wing is unstable. In the wing combination of this invention the stall conditions occur at very large angles of attack and the wing is stable, tending to return to normal conditions of flight. In other words, the disadvantageous and dangerous "stall" conditions of the present wings in use are changed over to useful, advantageous, and safe when the wing of the present invention is placed into a "stall" condition. In short, it may be said that the unsafe, unstable, disadvantageous stall conditions of the present day wings are turned into useful conditions of safety, stability, and a multitude of other advantages.

The most important advantage gained by the use of my wing construction is the prevention of the tail spin. When a machine approaches the stall condition one side or tip of the wing surface loses its lift while the opposite side thereof increases its lift, throwing the whole machine into a fast roll and later into a complicated motion about its major axis, often causing bad accidents. The pilot does not have time, strength, or perhaps knowledge to return it to normal. In fact, many pilots have been known to do just opposite with their controls than that which is required. A study of these problems shows that extremely rapid changes must occur in the aerodynamic characteristics of the wing to counteract the disturbing influence because the usual disturbance is "unstable," and increases in speed and strength, and if it is to be counteracted it must be done at the start. It is for this reason that the orienting vanes at the edges of my wing are free to move to an advantageous position at the slightest change in air flow and without the aid of the pilot.

The "burble" is caused by the break in the stream line flow of air around the wing. Once these stream lines are disturbed it is difficult to return to normal. The small orienting vanes at the leading and trailing edges of my wing serve to keep an unbroken line of air flow even at abnormal angles of attack.

The vanes in the ends or tips of the wings are provided to take care of the air troubles on the wing due to side slips and rotations about the axis of the machine.

These troubles in the condition of the air flow are never the same from tip to tip of the wings and it is for this reason that the air vanes or flaps are preferably not continuous along the entire wing. The correcting mechanism of my invention has independent sections from one end to the other so that each may function independent of the other in order to correct the trouble of its own section. In other words, while the vanes at one wing tip may swing upwardly, the vanes at the other tip swing downwardly and the intermediate ones may remain normal.

The main advantage of my invention is that the mechanism is fully automatic, is rapid and does not require the attention of the pilot, as it operates entirely independent of him. The invention does not interfere with the usual action of the controls; and, indeed, a machine equipped with this device does not require as large control surface as those now in use.

My invention is illustrated in the accompanying drawings, wherein:

Fig. 1 represents a top plan view of an airplane with my improved edge vanes on all edges;

Fig. 2, a fragmentary perspective section along lines 2—2 of Fig. 1 with the trailing vanes hanging down as at rest;

Fig. 3, a similar sectional view along line 2—2 with the trailing vane swung upwards as in a drop, stall or climb of the airplane as indicated in Figs. 5 and 8;

Fig. 5 is a fore and aft section of my wing system with the leading and trailing vanes pointing upwards during a drop and bottom surface of the main wing substantially horizontal;

Fig. 6, a similar view, illustrating a vertical rise of the wing, showing the leading and trailing vanes pointing downwards as actuated by the relative wind direction while the bottom surface remains substantially horizontal;

Fig. 7, a similar view, illustrating the relative position of the main wing and the blades during normal, forward travel or a climb of about 10°.

Fig. 8, a similar view, showing the relative position of the main wing and fore and aft vanes, the latter pointing upwards as directed by the wing during a rapid climb of the airplane or approach to stalled condition;

Fig. 9 shows how my wing construction is evolved from the best type of present day wing, and Fig. 10, a fragmentary tip to tip section of my wing system with the tip vanes turned up on the left end and down on the right end, while the main wing is inclined upwards to the right as in a lateral disturbance.

Figure 1:
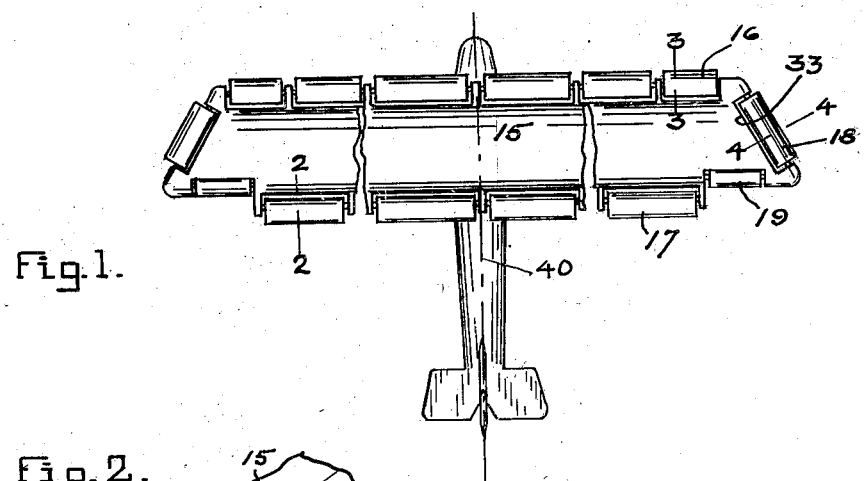
Figure 2:
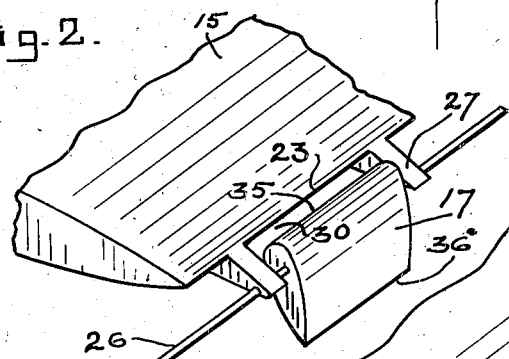

In the drawings reference numeral 15 represents the main wing in my wing system, 16 the leading vanes or flaps, 17 the trailing vanes, and 18 the tip vanes. Besides these vanes which I provide along all free edges of the main wing 15, and which vanes are perfectly free to swing or rotate as actuated by the wind currents, there are also shown in Fig. 1 the usual ailerons 19 which are not free, but actuated by the pilot in well known manner, and which ailerons do not form any part of the present invention, being common to all present day airplanes.

Referring to Fig. 9 of the drawings, this indicates the contour of a common type of wing now being used in aeronautics and out of this is evolved my wing system. This view shows a cambered top surface 20 and a substantially flat bottom surface 21. In order now to produce my wing system, I shorten this wing fore and aft, thereby obtaining a slightly blunter nose or leading edge 22 and an upwardly curved trailing edge 23, the rear portion 24 of the bottom surface 21 being curved upwards from the straight bottom surface to meet the upper unchanged top surface 20 instead of running to almost a sharp point 25 as formerly.

Within the contour of the cut-away rear portion I now place a flap or vane 17 having bulged top and bottom surfaces which practically coincide with the contour of the cut-away trailing portion in order to restore the rear end of the wing to that of the high speed type referred to, so that practically no change has taken place for normal flying.

Figure 3:
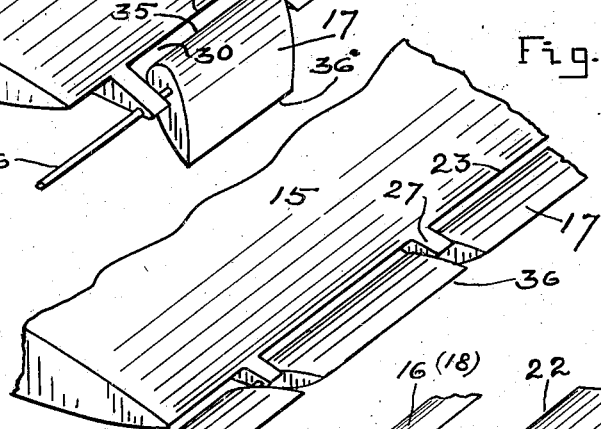

This trailing vane 17 is hinged on a journal 26 carried on rearwardly extending bearing arms 27 beyond the rear or trailing edge 23 of the main wing 15, and the vane 17 is free to rotate on this journal as actuated by the attacking wind having no gearing whatsoever and being consequently perfectly independent of any actions of the pilot. As indicated in Figs. 1 and 3, I preferably provide a plurality of these vanes 17 along the rear edge 23 of the main wing and with their journal axes parallel thereto. This has the advantage that in the case of the wind pressure attacking the under side of one end of the wing and the upper side of the other end thereof, the vanes 17 at said first end would turn automatically upward, while the vanes at the other end would turn automatically downward, thus causing a stabilizing effect. In some cases a single trailing vane 17 may, however, be provided, which then extends practically along the entire length of the main wing.

Figure 4:
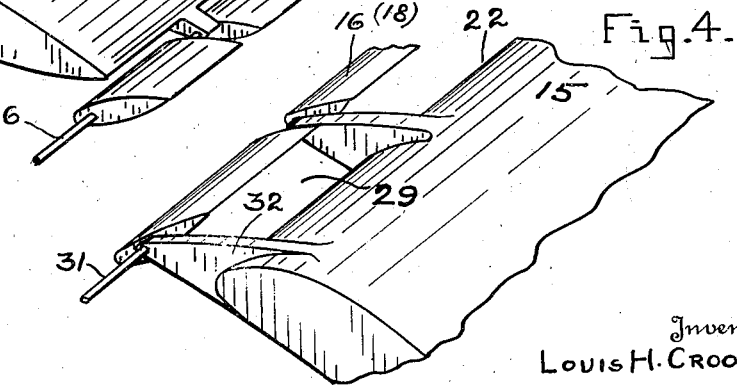
Fig. 4 is a similar sectional view along line 3—3 or 4—4 of Fig. 1, showing a leading vane or a tip vane pointing upwards as in a drop or climb.

Similarly, I provide one or more leading vanes 16, see particularly Figs. 1 and 4, with bulged surfaces to substantially conform to the contour of the eliminated leading portion 28, Fig. 9, and substantially restore the shape of the common type wing for normal flight. It should here be noted that only a very narrow air passage 29 is thus created at the leading edge and an equally narrow air passage 30 at the trailing edge of the wing during normal flight.

The leading vane or vanes 16 also have a journal axis 31 upon which they are free to turn actuated by the attacking wind without any gearing or pilot controls. The journal which runs substantially parallel to the leading edge 22 of the main wing is carried in bearing arms 32 which project forwardly from the main wing 15 of which they are a part.

Similar in shape, and function to the leading vanes 16, tip vanes 18 are also mounted along the tip edges 33 of the main wing 15, see Fig. 10. These tip vanes are intended to act automatically during side slips and rotations around the longitudinal axis 40 of the air plane and to assist in stabilizing it.

As already stated, all the vanes 16, 17 and 18 have bulged edges and are mounted on their respective journal axes in such a manner that they become aerodynamically stable in all positions. In other words, the axis of the journal 26 lies nearer to the top and bottom surfaces of the trailing vane 17, for instance, than to either the leading edge 35 or the trailing edge 36 thereof, but nearer edge 35 than edge 36. As a consequence, during normal flight when the vanes are in substantial alinement with the main wing 15, as in Fig. 7, the air passages 29 and 30 are almost closed, while directly the inclination of the main wing increases or the angle of air attack changes, as under a stall or climb, for instance, see Fig. 8, the vanes automatically turn out of the normal and the width of the air passages 29 and 30 increases and approximately at the same ratio as the angle of attack increases.

Referring now particularly to Fig. 5 of the drawings, this indicates the conditions during a drop. The direction of the "True Wind" is then practically horizontal or parallel to the bottom surface 21 of the wing 15. The angle of wind attack will then be in the direction of the component of the "true wind" and the "drop" as indicated by the arrows of "relative wind" in said figure. The vanes will then no longer remain in alinement with the wing 15, but turn upwardly actuated by the "relative wind" and widen the passages 29 and 30.

The opposite takes place during a "rise," as indicated in Fig. 3, where the "relative wind" direction is at an angle downwardly against the top surface 20 of the wing 15, as shown by arrows Y, thus turning the vanes in the same direction downwardly as the "relative wind" flows.

In Fig. 7 is shown the relative position of the main wing and the vanes during normal flight, while Fig. 8 indicates their position during a climb. The vanes in this case are now upwardly inclined as regards the main wing 15, thereby opening the air passages 29 and 30 wide to permit a considerable amount of air to flow therethrough, as shown by dotted lines Z, while other streams of air Z² flow above and below the leading and trailing vanes 16 and 17 as well as the main wing 15.

Lastly, Fig. 10 indicates the relative position of the main wing 15 and the side or tip vanes 18 when the airplane is in a side slip or rotates around its longitudinal axis 40. In that case the tip vanes point in the direction of turning so that the vane at one end turns up while the other one turns down, and that also in this instance the air passages become wider between the edges of the wing and the vanes at the tips of the wings.

In general it might here be stated that the vanes will take the direction of the resultant air pressures caused not only by the oncoming wind, but also from the influencing air pressures of the whole system.

The shape of the vanes depends to some extent on the shape of the main wing, so that, for instance, a flatter wing would require flatter vanes.

It is evident that many changes in the details and construction of the device may be made under the scope of the claims.

I claim:

1. A wing construction for aircraft, comprising a substantially rigid wing-body surrounded by flexible edges; each of said edges consisting of a series of vane sections, means for mounting each section about an axis parallel to the respective edge of said wing-body to obtain free oscillation as actuated by fluid pressure, thereby regulating the width of the fluid passage between said section and the corresponding edge of the body in accordance with the inclination between the pressure surfaces of said wing-body and the vane section.

2. A wing construction for aircraft, comprising a substantially rigid central body, leading, trailing and tip vanes forming the edges of said body, said vanes being divided into a plurality of sections, projecting arms on said body upon which said vane sections are mounted to oscillate independent of each other actuated by air pressure in order that aerodynamic stability may be attained and air passages opened automatically around the main body.

In testimony whereof I affix my signature.

LOUIS H. CROOK.